(12) United States Patent
Finley et al.

(10) Patent No.: US 8,597,602 B2
(45) Date of Patent: Dec. 3, 2013

(54) VACUUM TRUCK SCRUBBER SYSTEM

(75) Inventors: Alan Finley, Houston, TX (US); Lisha Salathiel, Houston, TX (US); Daryl Archuleta, Houston, TX (US)

(73) Assignee: Global Vapor Control, Inc., Houston, TX (US)

( * ) Notice: Subject to any disclaimer, the term of this patent is extended or adjusted under 35 U.S.C. 154(b) by 0 days.

(21) Appl. No.: 13/567,116

(22) Filed: Aug. 6, 2012

(65) Prior Publication Data

US 2013/0156666 A1  Jun. 20, 2013

Related U.S. Application Data

(60) Provisional application No. 61/515,690, filed on Aug. 5, 2011.

(51) Int. Cl.
| | |
|---|---|
| *A61L 9/00* | (2006.01) |
| *B01D 53/34* | (2006.01) |
| *B01D 53/38* | (2006.01) |
| *B01D 53/74* | (2006.01) |
| *B62D 63/00* | (2006.01) |

(52) U.S. Cl.
USPC ........... 423/210; 423/439; 422/168; 422/171; 422/119; 422/120; 180/313; 280/1

(58) Field of Classification Search
USPC .......... 423/210, 439; 422/168, 171, 119, 120; 180/313; 280/1
See application file for complete search history.

(56) References Cited

U.S. PATENT DOCUMENTS

| 5,711,785 A | 1/1998 | Maxwell |
|---|---|---|
| 6,805,729 B2 | 10/2004 | Lim et al. |
| 7,147,689 B1 | 12/2006 | Miller |
| 7,550,123 B2 | 6/2009 | Temple et al. |
| 2008/0206092 A1* | 8/2008 | Crapser et al. ..................... 422/5 |
| 2011/0232983 A1* | 9/2011 | Abe et al. ..................... 180/68.3 |

FOREIGN PATENT DOCUMENTS

GB    1105985 A    3/1968

OTHER PUBLICATIONS

PCT International Search Report and Written Opinion for International Application No. PCT/US12/49684 dated Nov. 16, 2012.

* cited by examiner

*Primary Examiner* — Timothy Vanoy
(74) *Attorney, Agent, or Firm* — Tumey L.L.P.

(57) ABSTRACT

A system and method scrub a vapor. In one embodiment, a vacuum truck scrubber system includes a liquid vat. The liquid vat comprises liquid. The system also includes a first carbon canister. The liquid vat is connected to the first carbon canister. The first carbon canister contains carbon. In addition, the system includes a second carbon canister. The first carbon canister is connected to the second carbon canister. The second carbon canister contains carbon. In addition, the system includes a third carbon canister. Moreover, the system includes that a vapor comprising contaminants is fed to the liquid vat and is introduced from the liquid vat to the first carbon canister wherein a portion of the contaminants are removed from the vapor. The vapor is introduced from the first carbon canister to the second carbon canister wherein another portion of the contaminants are removed from the vapor.

20 Claims, 9 Drawing Sheets

VACUUM TRUCK SCRUBBER SYSTEM

CROSS-REFERENCE TO RELATED APPLICATIONS

This application is a non-provisional that claims the benefit of U.S. application Ser. No. 61/515,690 filed on Aug. 5, 2011, which is incorporated by reference herein in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of vapor control and more specifically to the field of vacuum truck scrubbers.

2. Background of the Invention

Vapors at industrial facilities may be controlled by a wide variety of systems. Scrubber systems are conventional systems for controlling such vapors. Scrubber systems remove contaminants such as volatile organic compounds (VOC's) from the vapor. Scrubber systems are typically transportable by truck. Drawbacks to such conventional scrubber systems include inefficiencies in utilizing available space on the truck trailers. Further drawbacks include inefficiencies with remote monitoring of the systems.

Consequently, there is a need for an improved vacuum truck scrubber system.

BRIEF SUMMARY OF SOME OF THE PREFERRED EMBODIMENTS

These and other needs in the art are addressed in one embodiment by a vacuum truck scrubber system that includes a liquid vat. The liquid vat comprises liquid. The system also includes a first carbon canister. The liquid vat is connected to the first carbon canister. The first carbon canister contains carbon. In addition, the system includes a second carbon canister. The first carbon canister is connected to the second carbon canister. The second carbon canister contains carbon. In addition, the system includes a third carbon canister. Moreover, the system includes a vapor comprising contaminants that is fed to the liquid vat and is introduced from the liquid vat to the first carbon canister wherein a portion of the contaminants are removed from the vapor. The vapor is introduced from the first carbon canister to the second carbon canister wherein another portion of the contaminants are removed from the vapor.

These and other needs in the art are also addressed by a method for scrubbing contaminants from a vapor. The vapor comprises the contaminants. The method includes feeding a vapor to a liquid vat. The method also includes introducing the vapor from the liquid vat to a first carbon canister. The liquid vat is connected to the first carbon canister. In addition, the method includes removing a portion of the contaminants from the vapor in the first carbon canister. Moreover, the method includes introducing the vapor from the first carbon canister to a second carbon canister. The first carbon canister is connected to the second carbon canister. The method further includes removing another portion of the contaminants from the vapor in the second carbon canister. Additionally, the method includes providing a third carbon canister, wherein the third carbon canister comprises a reserve carbon canister.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
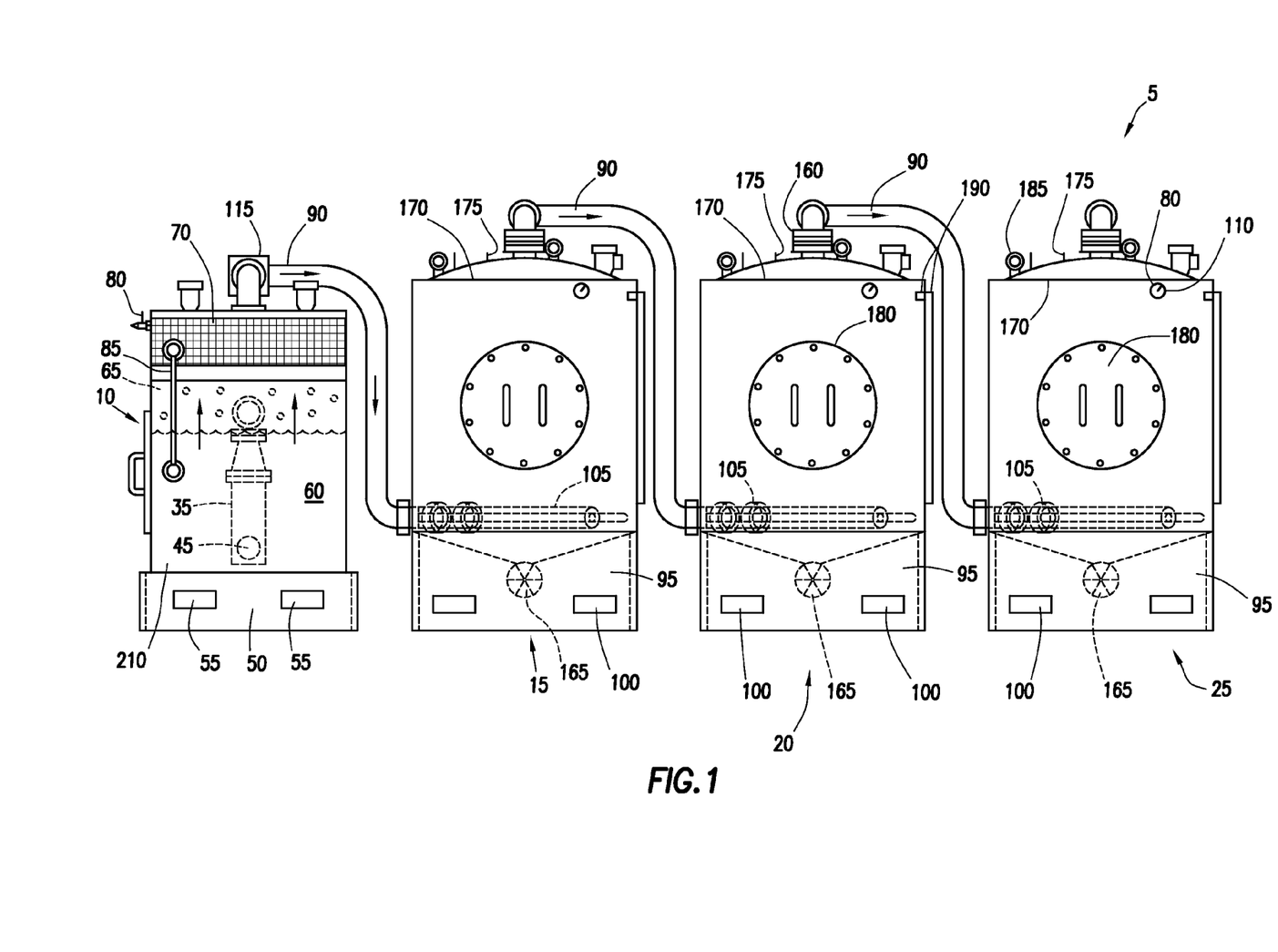
FIG. 1 illustrates a front view of an embodiment of a vacuum truck scrubber system.
Figure 2:
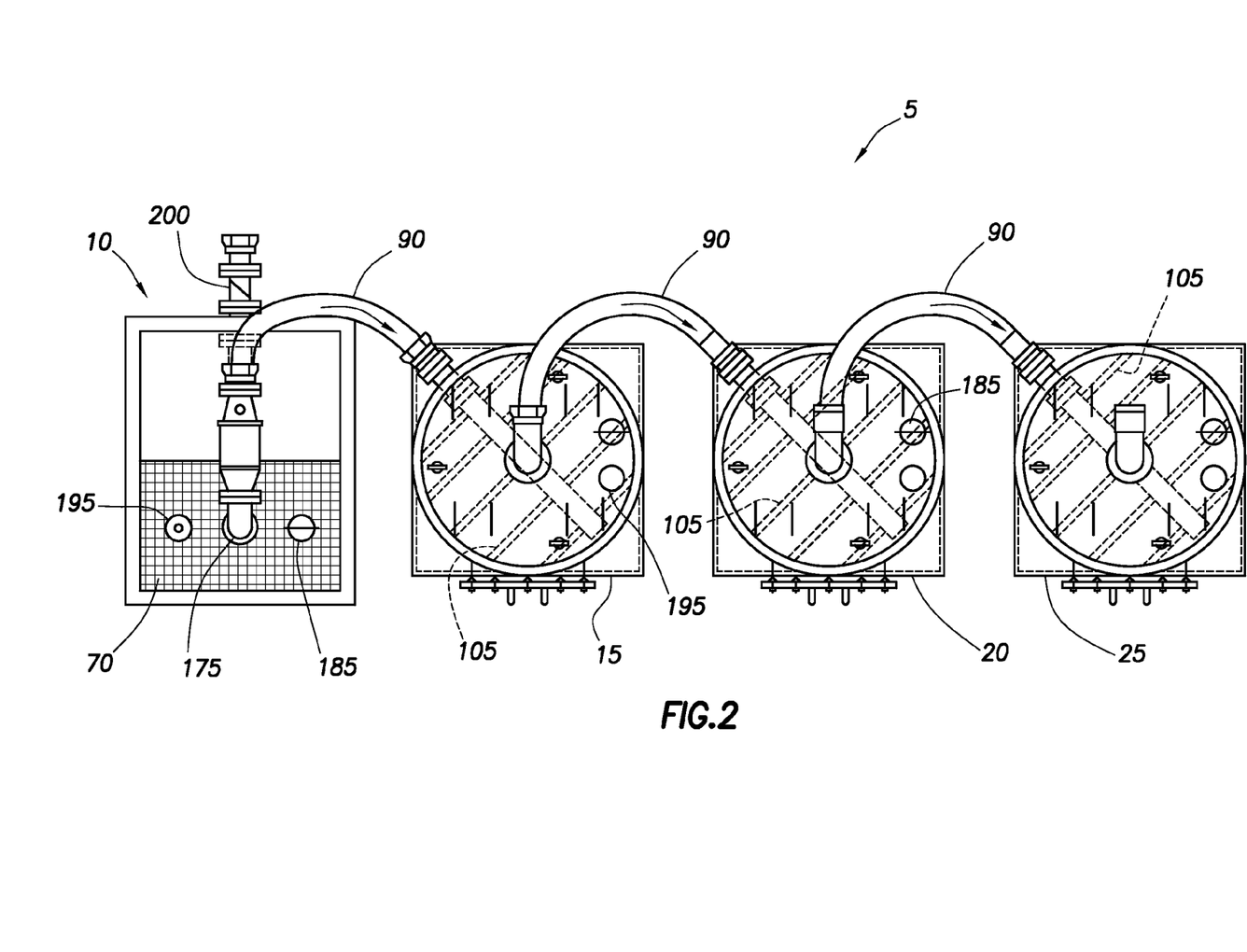
FIG. 2 illustrates a top view of the embodiment of a vacuum truck scrubber system shown in FIG. 1.
Figure 3:
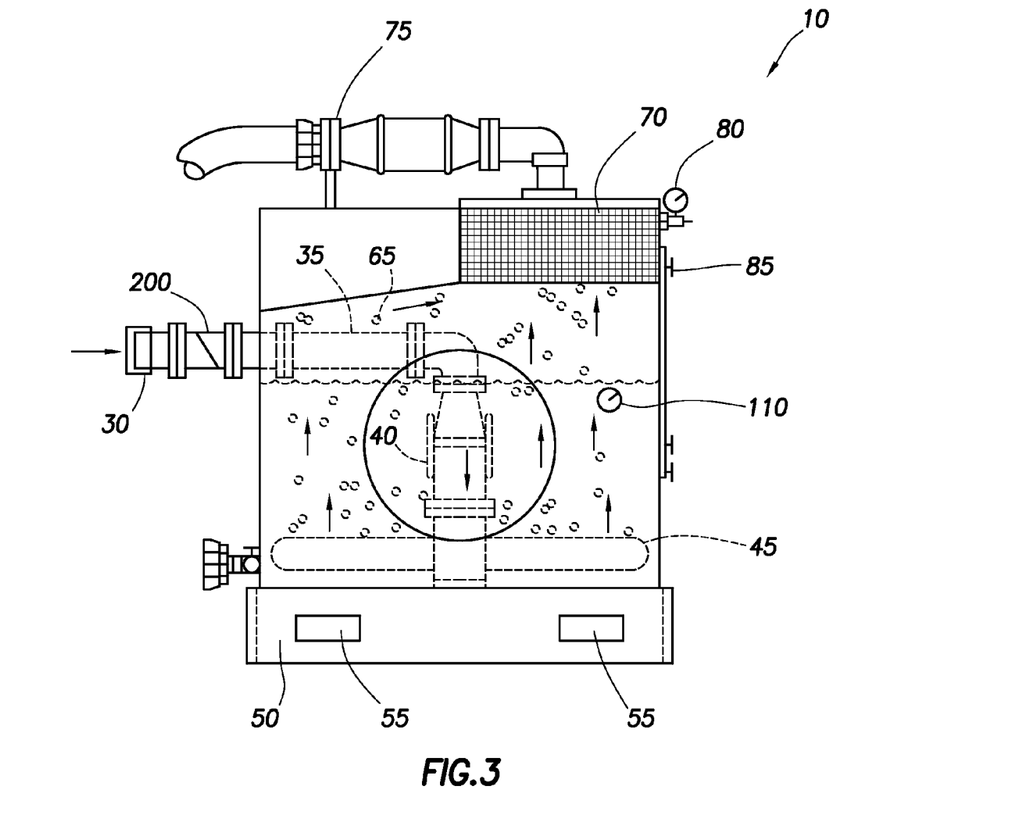
FIG. 3 illustrates a left view of the embodiment of a vacuum truck scrubber system shown in FIG. 1.
Figure 4:
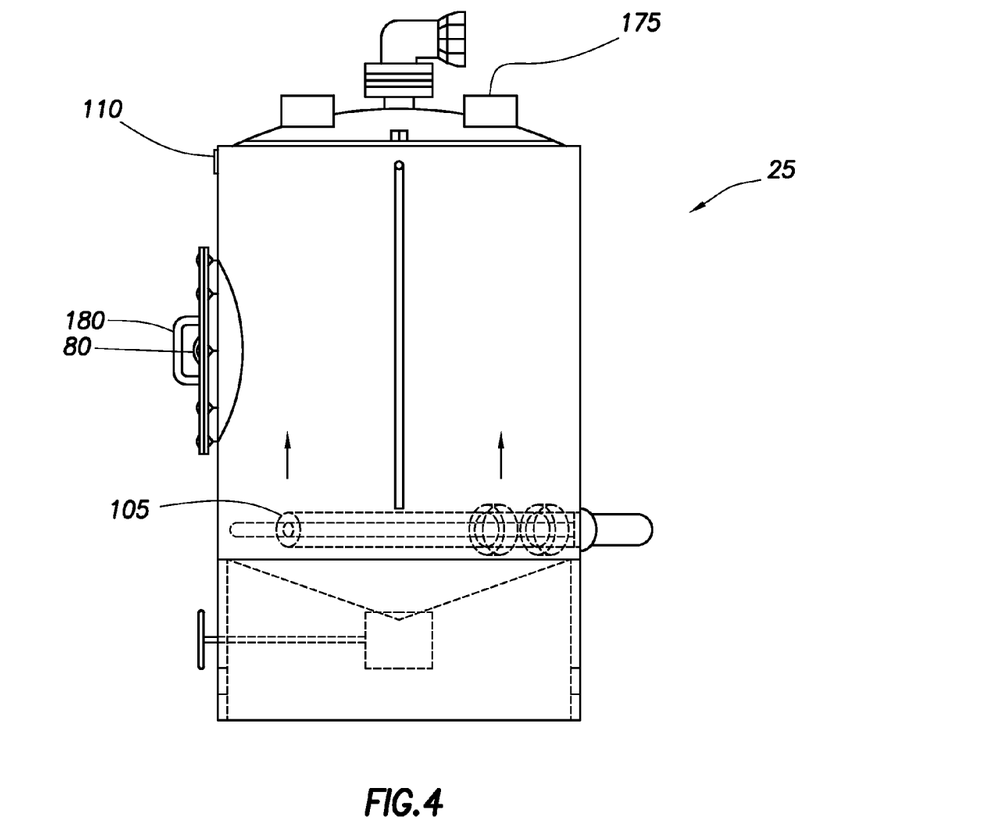
FIG. 4 illustrates a right view of the embodiment of a vacuum truck scrubber system shown in FIG. 1.

FIG. 1 illustrates a front view of an embodiment of vacuum truck scrubber system 5 in which vacuum truck scrubber system 5 includes liquid vat 10, first carbon canister 15, second carbon canister 20, and third carbon canister 25, FIG. 2 illustrates a top view of the embodiment of vacuum truck scrubber system 5 shown in FIG. 1. Vacuum truck scrubber system 5 is used for vapor control and degassing processes such as removing contaminants from vapor. Any contaminants may be removed. In embodiments, the contaminants include volatile organic compounds (e.g., VOC's). Without limitation, vacuum truck scrubber system 5 provides a portable and automatic scrubber system that allows remote monitoring and storing of data. In embodiments, vacuum truck scrubber system 5 is a portable system. Vacuum truck scrubber system 5 may be moved by any suitable means. Without limitation, embodiments include vacuum truck scrubber system 5 being moved by trailer, rail car (i.e., moveable by train when disposed on a rail car), and the like. In embodiments in which vacuum truck scrubber system 5 is moveable by trailer, the trailer may be moveable by any suitable means such as by truck, tractor, and the like.

Figure 6:
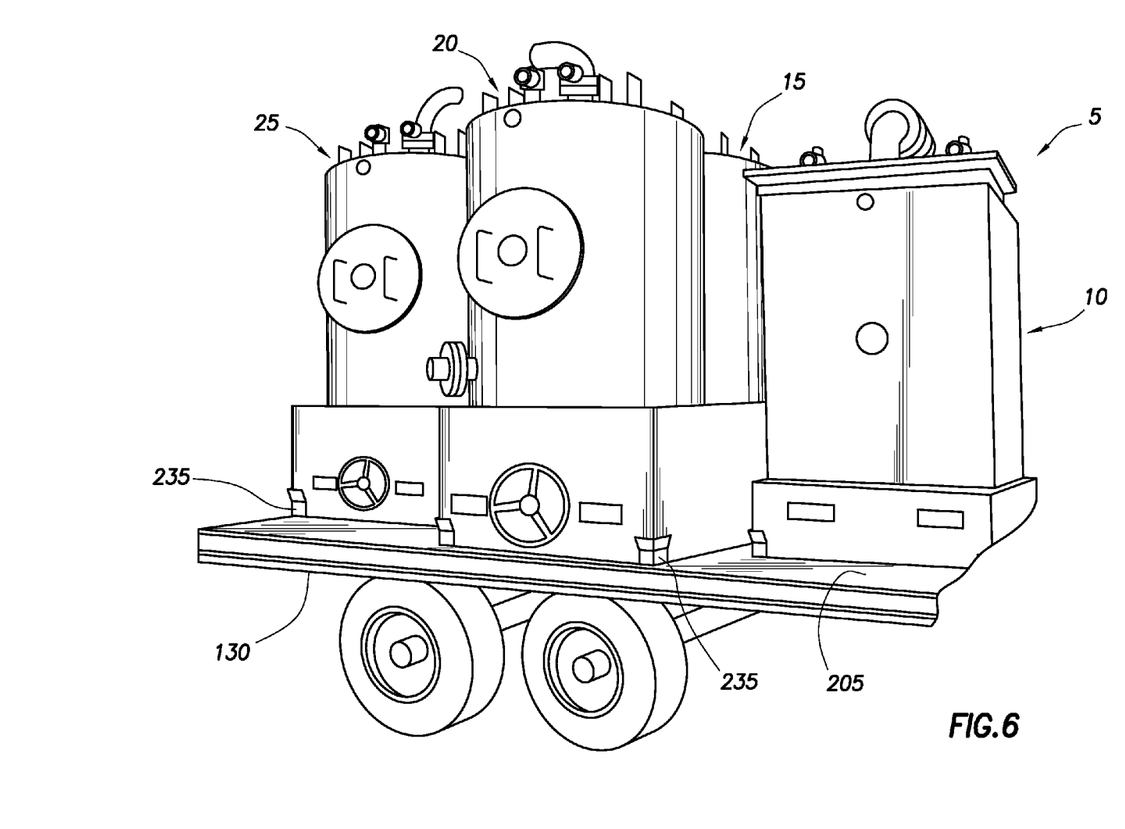
FIG. 6 illustrates a side perspective view of an embodiment of a vacuum truck scrubber system with the carbon canisters disposed in a triangular configuration.
Figure 7:
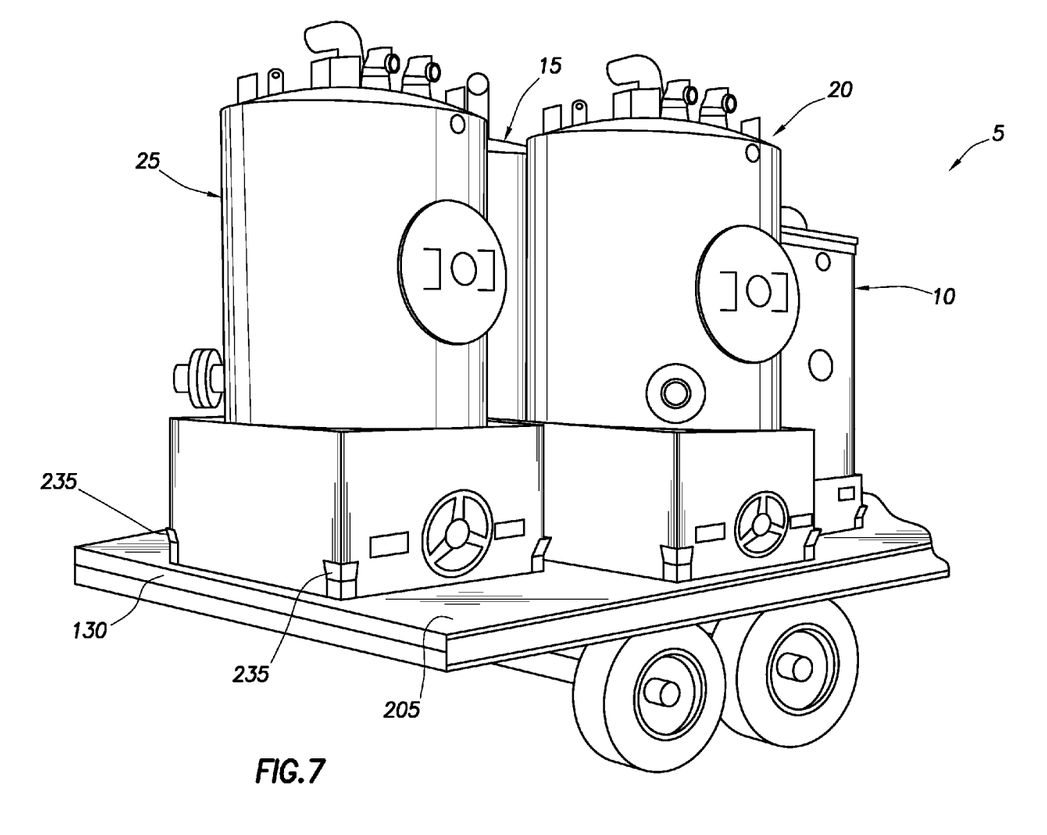
FIG. 7 illustrates another side perspective view of the embodiment of a vacuum truck scrubber shown in FIG. 6.

FIGS. 6 and 7 illustrate embodiments in which vacuum truck scrubber system 5 is disposed on bed 205 of trailer 130.

The vapor fed to vacuum truck scrubber system 5 may be from any vapor source. Without limitation, examples of vapor sources include vacuum trucks, process equipment, water-going vessels, and the like. Any process equipment in which vapor is desired to be scrubbed may be used. Without limitation, examples of suitable process equipment include vessels, tanks, columns, towers, API separators, and the like. Any water-going vessel in which vapor is desired to be scrubbed may be used. Without limitation, examples of suitable water-going vessels include tanker ships, barges, and the like. In an embodiment, the vapor source is a vacuum truck. In an embodiment, the vapor is the exhaust vapor from the vacuum truck. The vapor may be fed to vacuum truck scrubber system 5 by any suitable means such as, without limitation, eductor, blower, and the like.

As shown in FIGS. 1, 2, 3, 4, and 9, vacuum truck scrubber system 5 has liquid vat 10. Liquid vat 10 has vapor connection 30 to allow liquid vat 10 to be connected to the means (i.e., pipe, hose, line, and the like) by which vapor is introduced to vacuum truck scrubber system 5. In an embodiment, vapor 65 from a vacuum truck (not illustrated) is introduced by a line (not illustrated) to vacuum truck scrubber system 5. The line (not illustrated) is connected to liquid vat at vapor connection 30. From vapor connection 30, vapor 65 is fed into liquid vat 10 via feed pipe 35. Feed pipe 35 may have any suitable configuration and dimensions. In an embodiment as shown, feed pipe 35 has reducer 40 between different sized sections of feed pipe 35. From feed pipe 35, vapor 65 flows through vat sparger 45 and into interior 210 of liquid vat 10. Interior 210 contains liquid 60. In an embodiment, vat sparger 45 is disposed in liquid 60. Vat sparger 45 may have any suitable configuration for dispersing vapor 65 into liquid 60. Liquid 60 may include any liquid suitable for use in scrubbing vapor 65 of any desired contaminants (i.e., contaminants such as VOC's). In embodiments, liquid 60 includes diesel, water-based oxidizers, or any combinations thereof. Any water-based oxidizer suitable for use in scrubbing vapor 65 of contaminants may be used. Without limitation, a suitable water-based oxidizer is ZYME-FLOW®, which is a registered trademark of United laboratories International, LLC. In embodiments, vacuum truck scrubber system 5 includes selecting a liquid 60 to remove a certain contaminant, with the selected liquid 60 having known capability to remove the certain contaminant. Without being limited by theory, by selecting such liquid 60, the length of the life of the carbon in the canisters (e.g., first carbon canister 15, second carbon canister 20, and third carbon canister 25) may be lengthened. In addition, without being limited by theory, the acid and basic gases may be treated.

As further shown in FIGS. 1, 2, 3, 4, and 9, embodiments of vacuum truck scrubber system 5 include vapor 65 flowing upward from vat sparger 45 through liquid 60, which scrubs (i.e., removes) a portion of the contaminants from vapor 65. In an embodiment, vapor 65 then flows out of liquid vat 10. In embodiments as shown, vapor 65 flows through demister pad 70 before exiting liquid vat 10. Demister pad 70 may be disposed at any suitable location within liquid vat 10 whereby vapor 65 flows therethrough before exiting liquid vat 10. Without limitation, any suitable type of demister device and configuration may be used as demister pad 70. Further, without limitation demister pad 70 prevents or reduces the amount of liquid from entering into flame arrestor 75. In embodiments, liquid vat 10 also includes pressure gauge 80, sight glass 85, and temperature gauge 110, which may be disposed at any suitable location on liquid vat 10. In some embodiments as shown, liquid vat 10 also has eye hook 115 disposed at a top portion of liquid vat 10. In an embodiment as shown, liquid vat 10 also has check valve 200 disposed on vapor connection 30. In embodiments, first carbon canister 15, second carbon canister 20, and/or third carbon canister 25 have a valve 160 disposed at vapor 65 exit, which regulates whether the exit is opened or closed.

As further shown, liquid vat 10 also includes flame arrestor 75. Flame arrestor 75 may include any type of flame arrestor suitable for preventing flashback from a carbon canister (i.e., first carbon canister 15, second carbon canister 20, and third carbon canister 25) into liquid vat 10. Liquid vat 10 also includes vat base 50, which has vat base openings 55. In an embodiment, vat base openings 55 are sufficient to allow liquid vat 10 to be moved by a fork-lift.

In an embodiment, first carbon canister 15, second carbon canister 20, and third carbon canister 25 contain carbon. In embodiments, the carbon is activated carbon. Without limitation, the activated carbon may include any activated carbon suitable for removing contaminants. In embodiments, the carbon is impregnated activated carbon. The activated carbon may be impregnated by any additive suitable for scrubbing vapor 65. Without limitation, examples of suitable additives for impregnation include potassium hydroxide, iodine, silver, aluminum, amine-based chemicals, manganese, zinc, iron, lithium, calcium or any combinations thereof. Further, without limitation, the impregnated activated carbon removes acid and/or basic components from vapor 65. In some embodiments, the activated carbon substantially fills the interior of each of first carbon canister 15, second carbon canister 20, and third carbon canister 25.

As shown in FIGS. 1, 2, 3, 4, and 9, vapor 65 exiting liquid vat 10 flows through canister feed 90 to first carbon canister 15. Canister feed 90 may be any device suitable for feeding vapor 65 to a carbon canister (e.g., first carbon canister 15, second carbon canister 20, or third carbon canister 25). In an embodiment, canister feed 90 is a flexible hose. In embodiments, the flexible hose comprises stainless steel. In embodiments as shown, vapor 65 exits liquid vat 10 at the top side of liquid vat 10 and is fed to first carbon canister 15 at about the bottom of a side of first carbon canister 15. In embodiments, such bottom of a side is about distal to the exit of vapor 65 from first carbon canister 15. Vapor 65 is dispersed into first carbon canister 15 via canister sparger 105. Canister sparger 105 is disposed at about the bottom of the interior of first carbon canister 15. Canister sparger 105 may have any configuration suitable for dispersing the vapor into the carbon, in first carbon canister 15. In an embodiment, canister sparger 105 has openings on the side of canister sparger 105 through which vapor 65 flows. Without limitation, disposing the openings on the side of canister sparger 105 prevents channeling in the carbon. Further, without limitation, disposing the openings on the side prevents plugging of the openings by the carbon.

Figure 5:
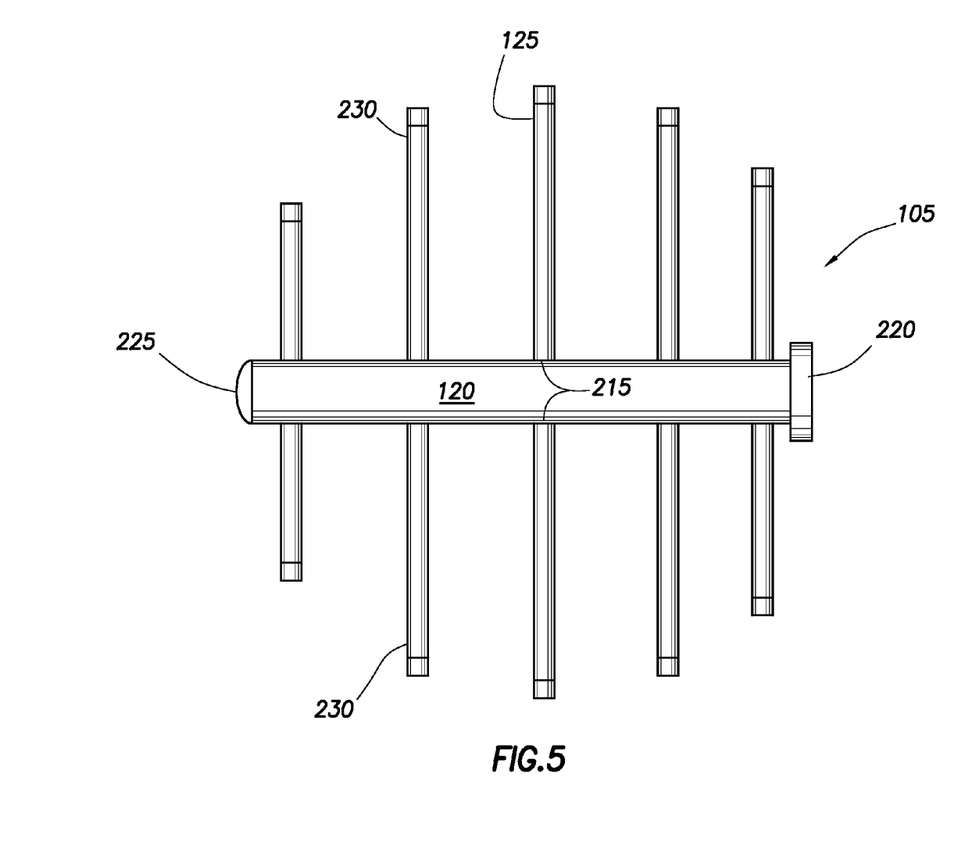
FIG. 5 illustrates an embodiment of a canister sparger.

FIG. 5 illustrates an embodiment of canister sparger 105 in which canister sparger 105 has canister sparger body 120, canister sparger arms 125, sparger vapor entry 220, and sparger end 225. In such embodiments, canister sparger arms 125 extend from canister sparger body 120. Canister sparger arms 125 may extend at any suitable angle to canister sparger body 120. In an embodiment, canister sparger arms 125 are disposed about perpendicular to sides 215 of canister sparger body 120. In such embodiments, vapor 65 flows into canister sparger body 120 from canister feed 90 via sparger vapor entry 220. From canister sparger body 120, vapor 65 flows into canister sparger arms 125. In embodiments, canister sparger arms 125 have openings on the sides 230 of canister sparger arms 125 (i.e., and not on the top side of canister sparger arms 125) through which vapor 65 flows. In embodiments, each canister sparger 105 has a valve (i.e., ball valve) at the connection with canister feed 90.

Figure 9:
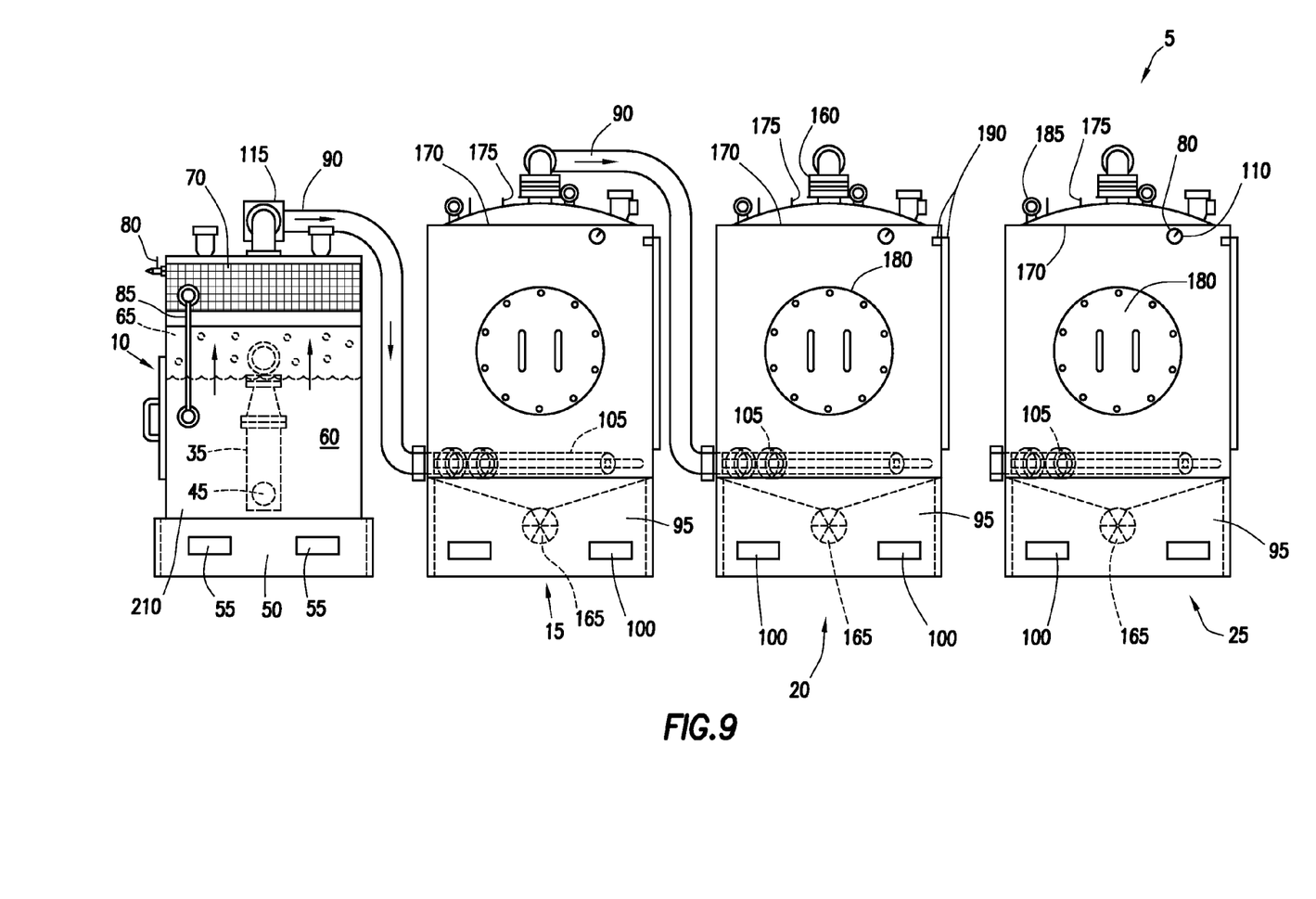
FIG. 9 illustrates a front view of an embodiment of a vacuum truck scrubber system.

In embodiments as shown in FIGS. 1, 2, and 9, first carbon canister 15, second carbon canister 20, and third carbon canister 25 have canister bases 95. Each canister base 95 has canister base openings 100. In an embodiment, canister base openings 100 are sufficient to allow the corresponding first carbon canister 15, second carbon canister 20 or third carbon canister 25 to be moved by a fork-lift. In other embodiments, first carbon canister 15, second carbon canister 20, and/or third carbon canister 25 have monitoring devices such as temperature gauges 110, pressure gauges 80, sample ports (not illustrated), sight glasses 85, and the like. In an embodiment, the sample ports are disposed on the entrance and exit of each carbon canister. Without limitation, the sample ports facilitate monitoring of VOC levels. For instance, the sample ports may be disposed on canister feeds 90 (e.g., hoses) at the entrance and exit of each carbon canister. In other embodiments as shown, first carbon canister 15, second carbon canister 20, and/or third carbon canister 25 have fire systems 190 such as sidewall sprinkler. In addition, embodiments include first carbon canister 15, second carbon canister 20, and/or third carbon canister 25 having pressure relief valves 185. Moreover, first carbon canister 15, second carbon canister 20, and/or third carbon canister 25 embodiments have vessel access 180. Embodiments of vessel access 18) include a sufficient configuration and size to allow a human to enter. In some embodiments, first carbon canister 15, second carbon canister 20, and/or third carbon canister 25 have vacuum breakers 195. In an embodiment, vacuum breaker 195 is disposed at a top portion of first carbon canister 15, second carbon canister 20, and/or third carbon canister 25.

In further embodiments as shown, first carbon canister 15, second carbon canister 20, and third carbon canister 25 each have carbon removal means 165. Carbon removal means 165 may include any means suitable for removal of the carbon (and for replacing the removed carbon) from a carbon canister. In embodiments, carbon removal means 165 includes a gate valve. In an embodiment, to remove the carbon from a carbon canister, the carbon canister is lifted up (i.e., by fork lift), and the carbon removal means 165 (e.g., gate valve) is actuated (i.e., opened), which allows the carbon to fall through the bottom (or alternatively a side) of the carbon canister. In some embodiments, the carbon canister has doors (not illustrated) such as butterfly doors on the bottom through which the carbon exits the carbon canister. Without limitation, a gate valve allowing the carbon to be removed at the bottom of the carbon canister facilitates efficient removal of the carbon instead of removing the carbon at the top of the carbon canister.

In other embodiments as shown in FIGS. 1, 2, and 9, first carbon canister 15, second carbon canister 20, and/or third carbon canister 25 also include a screen 170 disposed at about the top of the interior of the carbon canister. In some embodiments, screen 170 comprises mesh. Screen 170 comprises a configuration sufficient to prevent the carbon from exiting through the top of the carbon canister.

In embodiments as shown in FIGS. 1, 2, 4, and 9, first carbon canister 15, second carbon canister 20, and third carbon canister 25 have canister securing means 175. Canister securing means 175 include any means suitable for securing the carbon canisters to a trailer. Examples of suitable canister securing means 175 include strap guides and the like. In some embodiments (not illustrated), canister securing means 175 includes a cam lock. For instance, in embodiments, the cam lock is attached to bed 205 and rotates to attach the canister to bed 205.

In embodiments as shown in FIGS. 1, 2, 3, 4, and 9, vapor 65 flows upward through the carbon in first carbon canister 15, which removes a portion (or alternatively about all) of the contaminants from vapor 65. Vapor 65 then exits first carbon canister 15 at the top of first carbon canister 15 and is introduced to second carbon canister 20 by canister feed 90. Vapor 65 is introduced to canister sparger 105 and is dispersed into the carbon in second carbon canister 20. In embodiments as shown in FIG. 9, vapor 65 flows up through the carbon (with the carbon removing contaminants from vapor 65) and exits at the top of second carbon canister 20 (i.e., to atmosphere). In such embodiments as shown in FIG. 9, second carbon canister 20 is not connected to third carbon canister 25 by canister feed 90. Without limitation, third carbon canister is a reserve canister. In regards to the embodiments of FIGS. 1 and 2, canister feeds 90 are shown attached to first carbon canister 15, second carbon canister 20, and third carbon canister 25 for illustrative purposes only. In embodiments, upon a selected criteria being achieved in a carbon canister, such carbon canister is taken off line and replaced by the reserve canister (e.g., third carbon canister 25) as shown in FIG. 9. For instance, in such an embodiment, upon achievement of the criteria in first carbon canister 10, the attachment of liquid vat 10 to first carbon canister 10 by canister feed 90 is removed (i.e., the canister feed 90 is unattached), and the attachment of first carbon canister 10 to second carbon canister 15 by the canister feed 90 is removed (i.e., the canister feed 90 is unattached). In such embodiments, liquid vat 10 is then attached to second carbon canister 15 or third carbon canister 20 by canister feed 90, and second carbon canister 15 is attached to third carbon canister 20 by a canister feed 90. In such embodiments, liquid vat 10 is attached to second carbon canister 15. First carbon canister 10 then has its carbon replaced and becomes the reserve canister. Vacuum truck scrubber system 5 continues its operation with vapor 65 exiting liquid vat 10 to second carbon canister 20 (with vapor 65 flowing upward through the carbon to remove a portion of about all of the contaminants) and then to third carbon canister 25. Vapor 65 flows through the carbon removing contaminants (i.e., a portion or about all) and exits at the top of third carbon canister 25 to atmosphere. Upon a selected criteria being achieved in second carbon canister 20, second carbon canister 20 is taken off line and replaced by the reserve canister (e.g., first carbon canister 15). Liquid vat 10 is then attached to third carbon canister 25 (or alternatively first carbon canister 15) by canister feed 90, and third carbon canister 25 is attached to first carbon canister 15 by a canister feed 90. Second carbon canister 20 then has its carbon replaced and becomes the reserve canister. Vapor 65 then exits liquid vat 10 to third carbon canister 25 and from third carbon canister 25 to first carbon canister 15, with vapor 65 exiting at the top of first carbon canister 25 to atmosphere. Upon a selected criteria being achieved in third carbon canister 25, third carbon canister 25 is taken off line and replaced by the reserve canister (e.g., second carbon canister 20). Liquid vat 10 is then attached to first carbon canister 15 (or alternatively second carbon canister 20) by canister feed 90, and first carbon canister 15 is attached to second carbon canister 20 by a canister feed 90. Third carbon canister 25 then has its carbon replaced and becomes the reserve canister. The cycle continues as long as desired with the canisters being rotated as the reserve canisters as described above.

The criteria at which a carbon canister is taken off line for carbon replacement may be any desired criteria. In embodiments, a carbon canister is taken off line when a selected contaminant level in the carbon canister is reached. In an embodiment, the contaminant level is a VOC level. In embodiments, a carbon canister is taken off line when the VOC level reaches about 50 ppm, alternatively reaches about 75 ppm, and alternatively reaches about 90 ppm, and further alternatively reaches about 100 ppm.

FIGS. 6 and 7 illustrate an embodiment of vacuum truck scrubber system 5 in which liquid vat 10, first carbon canister 15, second carbon canister 20, and third carbon canister 25 are disposed on bed 205 of trailer 130 with first carbon canister 15, second carbon canister 20, and third carbon canister 25 disposed in a substantially triangular configuration. Without limitation, the substantially triangular configuration facilitates connection of a carbon canister to another carbon canister. Further, without limitation, the substantially triangular configuration facilitates efficient use of the available space on bed 205.

As further shown in FIGS. 6 and 7, embodiments of vacuum truck scrubber system 5 include bed 205 having placement guides 235. In embodiments, bed 205 has a placement guide 235 for at least one corner of vat base 50, canister base 95 of first carbon canister 15, canister base 95 of second carbon canister 20, and/or canister base 95 of third carbon canister 25. In an embodiment, bed 205 has a placement guide 235 for each corner (e.g., all four corners) of vat base 50, canister base 95 of first carbon canister 15, canister base 95 of second carbon canister 20, and/or canister base 95 of third carbon canister 25.

In alternative embodiments (not illustrated), vacuum truck scrubber system 5 has more than one reserve canister. In embodiments, one of the reserve canisters is disposed on bed 205, and the other reserve canisters are not disposed on bed 205.

Figure 8:
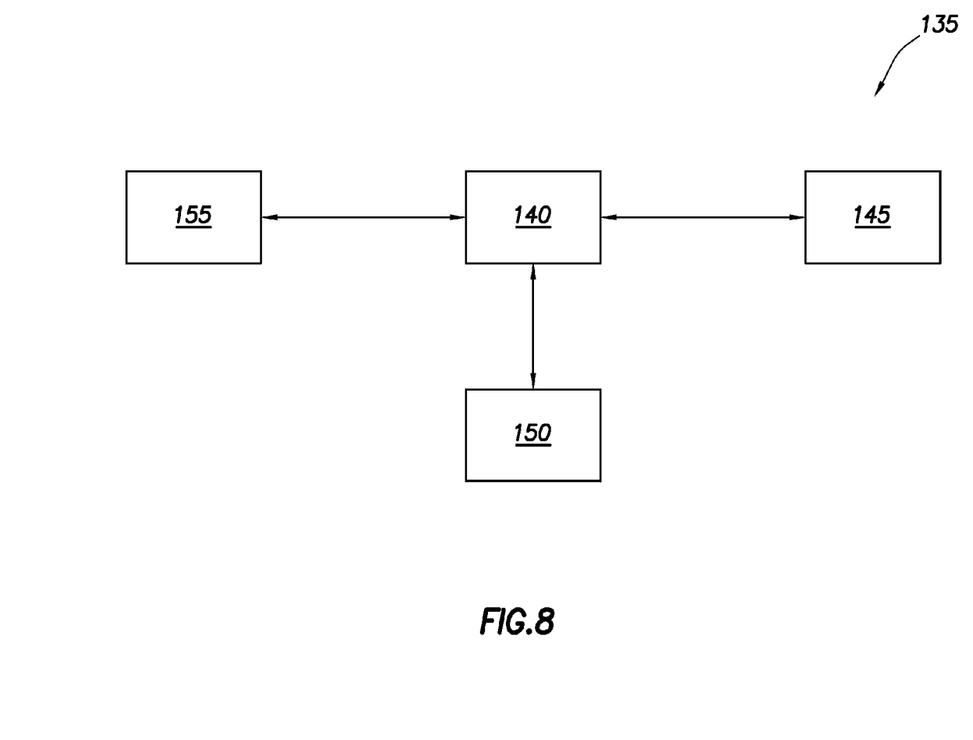
FIG. 8 illustrates an embodiment of a monitoring system.

In embodiments as shown in FIG. 8, vacuum truck scrubber system 5 includes monitoring system 135. Monitoring system 135 includes monitor 140, transmitter 145, portable station 150, and viewing station 155. Monitoring system 135 allows for continuous reading and recording of sample measurements such as contaminant (i.e., VOC levels) in each carbon canister. In an embodiment, a transmitter 145 is disposed on each carbon canister. In some embodiments, a transmitter 145 is disposed on liquid vat 10. Transmitter 145 may be any transmitter suitable for transmitting signals to monitor 140. For instance, in an embodiment, transmitter 145 has a transmitter and sensors that measure content of vapor 65 such as oxygen, toxins, VOC's and the like. Monitor 140 is any device suitable for reading and recording transmitted signals from transmitter 145. In embodiments, VOC levels in a carbon canister are determined by measuring the VOC level of vapor 65 feed to a carbon canister (e.g., from a sample port on canister feed 90) and measuring the VOC level of vapor 65 exiting the carbon canister (e.g., from a sample port on the exit of the carbon canister or on the canister feed 90 exiting the carbon canister). The difference between the VOC levels is determined and transmitted by transmitter 145 to monitor 140. In embodiments, monitor 140 is attached to trailer 130. Monitor 140 allows for reading and recording of VOC's and other measurements. Embodiments of monitor 140 also include setting of alarms that will provide notification when the criteria (e.g., targets) are achieved. For instance, the selected criteria (e.g., a target) may be a certain ppm level of VOC in a carbon canister. When the target is achieved, an alarm provides notification that the VOC level has been achieved or is within a range of being achieved. In embodiments, such target level may include when a carbon canister may be taken off line and serviced, and the non-connected carbon canister (i.e., the reserve carbon canister) may then be connected to the other carbon canister. In an embodiment, a target is set for first carbon canister 15. In embodiments, the target is set with sufficient leeway to allow time to change out the desired carbon canisters. In some embodiments, monitor 140 transmits signals to portable stations 150. Portable stations 150 may be any suitable portable station for receiving a signal. In embodiments, portable stations 150 are cellular phones. In such embodiments, monitor 140 sends a message such as a text message to the portable station (e.g., cellular phone) that a target is achieved or about to be achieved. Monitor 140 may also transmit signals to viewing stations 155. Such viewing stations 155 may be remote from vacuum truck scrubber system 5. Viewing stations 155 may be any device suitable for allowing transmitted data to be stored and viewed. For instance, an example of a suitable viewing station 155 is a computer. In some embodiments, monitoring system 135 allows monitor 140 to be controlled remotely from portable stations 150 and/or viewing stations 155. In embodiments, monitor 140 and/or transmitters 145 are intrinsically safe. In other embodiments, monitoring system 135 includes GPS capability. In an embodiment, monitor 140 and/or transmitters 145 have GPS capability. Without limitation, the GPS capability allows for the location of vacuum truck scrubber system 5 to be monitored. In embodiments, monitoring system 135 includes back grounding for the two connected carbon canisters. For instance, for the two connected carbon canisters, samples may be taken, and the VOC levels may be determined, which levels may be set as the base line. The target may then be set based on the baseline.

Although the present invention and its advantages have been described in detail, it should be understood that various changes, substitutions and alterations may be made herein without departing from the spirit and scope of the invention as defined by the appended claims.

What is claimed is:

1. A vacuum truck scrubber system, comprising:
   a liquid vat, wherein the liquid vat comprises liquid;
   a first carbon canister, wherein the liquid vat is connected to the first carbon canister, and wherein the first carbon canister contains carbon;
   a second carbon canister, wherein the first carbon canister is connected to the second carbon canister, and wherein the second carbon canister contains carbon; and
   a third carbon canister, wherein a vapor comprising contaminants is fed to the liquid vat and is introduced from the liquid vat to the first carbon canister wherein a portion of the contaminants are removed from the vapor, and wherein the vapor is introduced from the first carbon canister to the second carbon canister wherein another portion of the contaminants are removed from the vapor.

2. The vacuum truck scrubber system of claim 1, wherein the first carbon canister, the second carbon canister, and the third carbon canister are disposed in a substantially triangular configuration.

3. The vacuum truck scrubber system of claim 1, wherein the first carbon canister is connected to the liquid vat by a canister feed, and wherein the first carbon canister is connected to the second carbon canister by a second canister feed.

4. The vacuum truck scrubber system of claim 1, wherein the first carbon canister, the second carbon canister, and the third carbon canister each comprise a carbon removal means.

5. The vacuum truck scrubber system of claim 1, further comprising a monitoring system.

6. The vacuum truck scrubber system of claim 5, wherein the monitoring system comprises a monitor, a transmitter, a portable station, and a viewing station.

7. The vacuum truck scrubber system of claim 1, wherein the liquid vat is disconnected from the first carbon canister when a criteria is achieved.

8. The vacuum truck scrubber system of claim 7, wherein the liquid vat is connected to the second carbon canister, and wherein the second carbon canister is connected to the third carbon canister.

9. The vacuum truck, scrubber system of claim 1, wherein the liquid vat, the first carbon canister, the second carbon canister, and the third carbon canister are disposed on a trailer.

10. The vacuum truck scrubber system of claim 9, wherein the trailer comprises placement guides.

11. A method for scrubbing contaminants from a vapor, wherein the vapor comprises the contaminants, comprising:
   (A) feeding a vapor to a liquid vat;
   (B) introducing the vapor from the liquid vat to a first carbon canister, wherein the liquid vat is connected to the first carbon canister;
   (C) removing a portion of the contaminants from the vapor in the first carbon canister;
   (D) introducing the vapor from the first carbon canister to a second carbon canister, wherein the first carbon canister is connected to the second carbon canister;
   (F) removing another portion of the contaminants from the vapor in the second carbon canister; and
   (F) providing a third carbon canister, wherein the third carbon canister comprises a reserve carbon canister.

12. The method of claim 11, wherein the first carbon canister, the second carbon canister, and the third carbon canister are disposed in a substantially triangular configuration.

13. The method of claim 11, wherein the first carbon canister contains carbon, and wherein the second carbon canister contains carbon.

14. The method of claim 11, further comprising monitoring the first carbon canister to determine when a criteria is achieved.

15. The method of claim 14, when the criteria is achieved, further comprising disconnecting the liquid vat from the first carbon canister, and disconnecting the first carbon canister from the second carbon canister, and connecting the liquid vat to the second carbon canister, and connecting the second carbon canister to the third carbon canister.

16. The method of claim 15, further comprising introducing the vapor from the liquid vat to the second carbon canister, and further comprising removing a portion of the contaminants from the vapor in the second carbon canister.

17. The method of claim 16, further comprising introducing the vapor from the second carbon canister to the third carbon canister, and further comprising removing another portion of the contaminants from the vapor in the third carbon canister.

18. The method of claim 15, wherein the first carbon canister contains carbon, and further comprising removing the carbon from the first carbon canister.

19. The method of claim 11, wherein the third carbon canister is not connected to the first carbon canister or the second carbon canister.

20. The method of claim 11, wherein the liquid vat contains a water-based oxidizer.

* * * * *